United States Patent
James et al.

(10) Patent No.: US 11,805,754 B2
(45) Date of Patent: Nov. 7, 2023

(54) ANIMAL TRAINING DEVICE THAT CONTROLS STIMULUS USING PROPORTIONAL PRESSURE-BASED INPUT

(71) Applicant: CJE Products, LLC, Redmond, OR (US)

(72) Inventors: Chad R. James, Redmond, OR (US); Stephen G. Haynes, Halifax (CA); Roger H. Hess, Lesueur, MN (US)

(73) Assignee: CJE Products, LLC, Redmond, OR (US)

( * ) Notice: Subject to any disclaimer, the term of this patent is extended or adjusted under 35 U.S.C. 154(b) by 0 days.

(21) Appl. No.: 17/967,746

(22) Filed: Oct. 17, 2022

(65) Prior Publication Data

US 2023/0042381 A1 Feb. 9, 2023

Related U.S. Application Data

(63) Continuation of application No. 16/629,262, filed as application No. PCT/US2018/041310 on Jul. 9, 2018, (Continued)

(51) Int. Cl.
*A01K 15/02* (2006.01)
*H04W 84/00* (2009.01)
(Continued)

(52) U.S. Cl.
CPC ......... *A01K 15/021* (2013.01); *A01K 27/009* (2013.01); *G06F 3/016* (2013.01); *G06F 3/0202* (2013.01); *H04W 84/00* (2013.01)

(58) Field of Classification Search
CPC .. A01K 15/021; A01K 15/023; A01K 27/009; G06F 3/016; G06F 3/0202
(Continued)

(56) References Cited

U.S. PATENT DOCUMENTS 4,202,293 A * 5/1980 Gonda ................ A01K 15/022
119/908
4,335,682 A * 6/1982 Gonda ................ A01K 15/021
119/908
(Continued)

FOREIGN PATENT DOCUMENTS

FR 2873264 A1 * 1/2006 .......... A01K 15/021
WO WO-2012075587 A1 * 6/2012 .......... A01K 15/021
WO WO-2017087363 A1 * 5/2017 .......... A01K 15/021

*Primary Examiner* — Peter M Poon
*Assistant Examiner* — Morgan T Jordan
(74) *Attorney, Agent, or Firm* — Messner Reeves LLP

(57) ABSTRACT

A system for training animals includes a hand-held device and a remote device, where the remote device applies a stimulus when a user presses a button or trigger on the hand-held device. The amount of pressure applied is measured by a pressure sensitive transducer and transformed into proportional transducer signals. These transducer signals are transmitted to the remote device, which then applies a stimulus to an animal being trained. The amplitude of the applied stimulus corresponds to the amplitude of the transducer signals; a trainer can thus precisely control the intensity of the stimulus by applying and relieving pressure on the button. The type of stimulus applied is controlled based on the position of a rotary switch on the hand-held device. Sensor data generated by specialized sensors in the remote device may be transmitted to the hand-held device to provide the user with sensory feedback.

20 Claims, 9 Drawing Sheets

Related U.S. Application Data now Pat. No. 11,470,816, which is a continuation of application No. 15/644,709, filed on Jul. 7, 2017, now Pat. No. 10,375,930.

(51) Int. Cl.
*A01K 27/00* (2006.01)
*G06F 3/01* (2006.01)
*G06F 3/02* (2006.01)

(58) Field of Classification Search
USPC ........................................ 119/719; 340/573.3
See application file for complete search history.

(56) References Cited

U.S. PATENT DOCUMENTS

| | | | |
|---|---|---|---|
| 4,644,101 A * | 2/1987 | Jin | G06F 3/045 178/18.05 |
| 4,802,482 A * | 2/1989 | Gonda | A01K 15/021 119/908 |
| 4,813,419 A * | 3/1989 | McConnell | A61F 11/04 340/407.1 |
| 4,933,660 A * | 6/1990 | Wynne, Jr. | G01L 1/205 338/114 |
| 4,947,795 A * | 8/1990 | Farkas | A01K 27/009 119/718 |
| 5,008,497 A * | 4/1991 | Asher | G06F 3/045 178/18.05 |
| 5,038,142 A * | 8/1991 | Flower | G06F 3/04142 345/173 |
| 5,054,428 A * | 10/1991 | Farkus | A01K 27/009 340/573.3 |
| 5,353,744 A * | 10/1994 | Custer | A01K 27/009 119/908 |
| 5,465,687 A * | 11/1995 | Custer | A01K 15/023 119/908 |
| 5,471,954 A * | 12/1995 | Gonda | A01K 15/021 119/908 |
| 5,559,498 A * | 9/1996 | Westrick | A01K 15/023 119/908 |
| 5,666,908 A * | 9/1997 | So | A01K 15/021 119/720 |
| 5,911,199 A * | 6/1999 | Farkas | A01K 15/021 119/908 |
| 5,913,284 A * | 6/1999 | Van Curen | A01K 15/021 119/718 |
| 6,019,066 A * | 2/2000 | Taylor | G11B 31/003 119/908 |
| 6,073,589 A * | 6/2000 | Curen | A01K 27/009 340/573.3 |
| 6,131,535 A * | 10/2000 | So | A01K 15/021 340/573.3 |
| 6,135,060 A * | 10/2000 | So | A01K 15/021 340/573.3 |
| 6,167,843 B1 * | 1/2001 | Kim | A01K 15/021 119/859 |
| 6,170,439 B1 * | 1/2001 | Duncan | A01K 15/021 119/908 |
| 6,360,697 B1 * | 3/2002 | Williams | A01K 27/009 119/908 |
| 6,474,269 B2 * | 11/2002 | So | A01K 15/021 119/719 |
| 6,509,848 B1 * | 1/2003 | Ogata | H01H 13/807 200/515 |
| 6,549,133 B2 * | 4/2003 | Duncan | A01K 15/021 119/908 |
| 6,598,563 B2 * | 7/2003 | Kim | A01K 15/021 119/719 |
| 6,637,376 B2 * | 10/2003 | Lee, IV | A01K 15/021 119/719 |
| 6,860,240 B2 * | 3/2005 | Kim | A01K 15/021 119/908 |
| 6,874,447 B1 * | 4/2005 | Kobett | A01K 15/021 119/712 |
| 7,017,524 B2 * | 3/2006 | Gillis | A01K 15/021 119/908 |
| 7,111,586 B2 * | 9/2006 | Lee | A01K 27/009 119/908 |
| 7,174,855 B2 * | 2/2007 | Gerig | A01K 15/023 119/718 |
| 7,671,846 B1 * | 3/2010 | Komata | G06F 3/0346 345/173 |
| 7,677,204 B1 * | 3/2010 | James | A01K 15/02 119/859 |
| 8,757,098 B2 * | 6/2014 | So | A01K 15/021 119/859 |
| 8,887,670 B2 * | 11/2014 | So | A01K 15/021 119/720 |
| 9,043,993 B1 * | 6/2015 | James | A01K 15/021 |
| 9,405,397 B2 * | 8/2016 | Kuge | G06F 3/04883 |
| 9,693,536 B1 * | 7/2017 | Dana | A01K 27/001 |
| 9,750,227 B2 * | 9/2017 | Womble | A01K 1/0356 |
| 2002/0073932 A1 * | 6/2002 | Williams | A01K 15/021 119/720 |
| 2002/0175808 A1 * | 11/2002 | Okada | B06B 1/023 340/407.1 |
| 2003/0116101 A1 * | 6/2003 | Kim | A01K 15/022 119/720 |
| 2005/0145201 A1 * | 7/2005 | Gillis | A01K 15/021 119/720 |
| 2005/0217606 A1 * | 10/2005 | Lee | A01K 15/021 119/720 |
| 2006/0017691 A1 * | 1/2006 | Cruz-Hernandez | G06F 3/016 345/156 |
| 2006/0049920 A1 * | 3/2006 | Sadler | G06F 1/1684 340/407.1 |
| 2006/0092139 A1 * | 5/2006 | Sharma | G06F 3/0412 345/173 |
| 2007/0221138 A1 * | 9/2007 | Mainini | A01K 15/021 119/720 |
| 2008/0236513 A1 * | 10/2008 | Barlebo-Larsen | A01K 27/009 119/858 |
| 2009/0120373 A1 * | 5/2009 | Wetzel | A01K 15/021 119/719 |
| 2010/0261526 A1 * | 10/2010 | Anderson | G06F 3/016 345/157 |
| 2011/0007023 A1 * | 1/2011 | Abrahamsson | G06F 3/0416 345/174 |
| 2011/0046687 A1 * | 2/2011 | Naschberger | A61H 23/0236 607/3 |
| 2011/0094454 A1 * | 4/2011 | Won | A01K 15/021 340/573.3 |
| 2011/0187537 A1 * | 8/2011 | Touchton | A01K 27/001 340/573.3 |
| 2012/0212895 A1 * | 8/2012 | Cohen | B06B 1/12 361/679.02 |
| 2012/0272924 A1 * | 11/2012 | So | A01K 15/021 119/720 |
| 2012/0306766 A1 * | 12/2012 | Moore | G06F 3/04883 345/173 |
| 2013/0112153 A1 * | 5/2013 | So | A01K 15/021 119/720 |
| 2014/0261233 A1 * | 9/2014 | So | A01K 27/009 119/720 |
| 2015/0156990 A1 * | 6/2015 | Van Curen | A01K 27/009 119/720 |
| 2015/0216142 A1 * | 8/2015 | Landers | H04W 4/021 711/154 |
| 2015/0251089 A1 * | 9/2015 | Komori | A63F 13/285 463/35 |
| 2015/0373951 A1 * | 12/2015 | Kelly | A01K 29/005 340/573.3 |
| 2016/0015004 A1 * | 1/2016 | Bonge, Jr. | A01K 15/02 119/718 |
| 2016/0069760 A1 * | 3/2016 | Chiang | G08B 21/182 340/626 |
| 2016/0100552 A1 * | 4/2016 | So | A01K 15/022 119/859 |

(56) References Cited

U.S. PATENT DOCUMENTS

| | | | |
|---|---|---|---|
| 2016/0100556 A1* | 4/2016 | Bianchi | A01K 27/001 |
| | | | 455/414.1 |
| 2016/0286760 A1* | 10/2016 | Manguette | A01K 15/021 |
| 2016/0302386 A1* | 10/2016 | Zhao | A01K 27/003 |
| 2016/0366858 A1* | 12/2016 | Seltzer | A01K 29/005 |
| 2017/0156294 A1* | 6/2017 | Landers | G06F 16/2237 |
| 2017/0177140 A1* | 6/2017 | Lee | G06F 3/03547 |
| 2017/0208775 A1* | 7/2017 | Van Curen | A01K 15/022 |
| 2017/0223928 A1* | 8/2017 | Davino | H04N 7/155 |
| 2017/0237929 A1* | 8/2017 | Park | G06F 3/0231 |
| | | | 348/734 |
| 2017/0290295 A1* | 10/2017 | Quesnel | A01K 15/023 |
| 2018/0184618 A1* | 7/2018 | Gotts | A01K 15/023 |
| 2018/0275756 A1* | 9/2018 | Rai | G06F 3/04847 |

* cited by examiner

ANIMAL TRAINING DEVICE THAT CONTROLS STIMULUS USING PROPORTIONAL PRESSURE-BASED INPUT

CROSS-REFERENCE TO RELATED APPLICATIONS

This application is a continuation of U.S. patent application Ser. No. 16/629,262, filed Jan. 7, 2020, now U.S. Pat. No. 11,470,816, which is a National Stage Entry of International Patent Application No. PCT/US2018/041310 filed Jul. 9, 2018, which is a continuation of and claims the benefit of priority from U.S. patent application Ser. No. 15/644,709, filed under the same title on Jul. 7, 2017, now U.S. Pat. No. 10,375,930, the contents of which are incorporated herein by reference in their entireties.

BACKGROUND

In the training of animals, particularly dogs, owner/handler/trainers, since the late 1960's, have employed various electronic techniques and technologies to encourage or discourage a dog's actions, whereby the dog learns proper behaviors that are desired in our society. These electronic aides whether remote controlled by the user, manually controlled by sensor inputs, or automatically controlled by the dog's own actions have advanced throughout the years to become household-brand names gaining prominence in today's electronic world. Different kinds of electronic cue signals have been employed using varying degrees or levels of audible sounds (tones/buzzers), vibration sensations, electrical impulse, and percussion sensations. With this knowledge gained through the years, focus has been on making these cue signals fit specific events while improving the dog's acceptance in learning its tasks more easily.

During this collective evolution, manufacturers have offered dog owners the capability to select different levels of these cue signals from a remote distance and at over one hundred different levels. From this vantage, what has been learned is that a single given level will not always be the appropriate level to use for a cue signal; but rather many levels are necessary dependent upon the individual animal's temperament and distraction level at any given moment (e.g., adrenal releases).

Thus, having the means to quickly adjust the level of the cue signal to match the dog's focus has become very important. Even a selector dial with many levels to select from may not be enough as the discrete levels achievable by the selector dial may not be the proper level to match the animal's adrenal release and distraction, and the proper level may instead exist in the non-selectable signal levels in-between the selectable discrete levels.

Therefore, a device is needed which provides proportional, gradual levels that can be quickly adjusted just as the volume control in one's car radio - fitting the individual's hearing quality while overcoming background noise levels. In this same manner, the device's output needs to finitely change to match the dog's adrenaline and background distractions at any given moment and at appropriate distances.

SUMMARY

A system for animal training may include a transmitter, which may be a hand-held device, and a receiver, which may be a stimulus application device. The hand-held device may include pressure sensitive input circuitry, selector input circuitry, and a first antenna. The pressure sensitive input circuitry may include a transducer that produces transducer signals in response to pressure applied to the transducer (e.g., by a user). The pressure applied to the transducer at a given time may correspond to the amplitudes of transducer signals produced by the transducer at the given time. The transducer may include a force sensitive resistor. The selector input circuitry may have selectable positions that each correspond to a stimulus type. The selector input circuitry may produce a stimulus selection code that corresponds to a selected stimulus type based on one of the selectable positions. The first antenna may transmit the transducer signal and the stimulus selection code to the receiver.

The stimulus application device may include a second antenna and stimulus application circuitry. The second antenna may receive the transducer signals and the stimulus selection code from the first antenna. The stimulus application circuitry may apply a stimulus of the selected stimulus type according to the stimulus selection code at an amplitude at least partially defined by the transducer signals.

In some embodiments, the stimulus application device may include sensor circuitry that detects environmental conditions and that produces sensor data based on the detected environmental conditions. The sensor data may be video data, temperature data, chemical signature data and/or biological sensor data. The second antenna may transmit the sensor data to the first antenna. The hand-held device may further include visual output circuitry having a screen that displays information corresponding to the sensor data.

In some embodiments, the hand-held device may include a microprocessor coupled between the first antenna and the transducer that controls a rate of change of the amplitude of the transducer signals over time according to a predetermined threshold.

In some embodiments, the hand-held device may include vibrator circuitry that vibrates at an intensity proportional to the amplitude of the stimulus applied by the stimulus application circuitry. The vibrator circuitry may include a pancake motor vibrator. In some embodiments, the stimulus application device may include a microprocessor coupled between the stimulus application circuitry and the second antenna that controls a rate of change of the amplitude of the applied stimulus based on device settings. The microprocessor may produce feedback control signals that determine the intensity at which the vibrator circuitry vibrates.

In some embodiments, the selector input circuitry of the hand-held device may include a rotary switch. In some embodiments, stimulus type of the applied stimulus may be electrical impulse stimulation, sound stimulation, percussion stimulation, light stimulation, vibration stimulation, taste stimulation, or smell stimulation.

DETAILED DESCRIPTION

Figure 1:
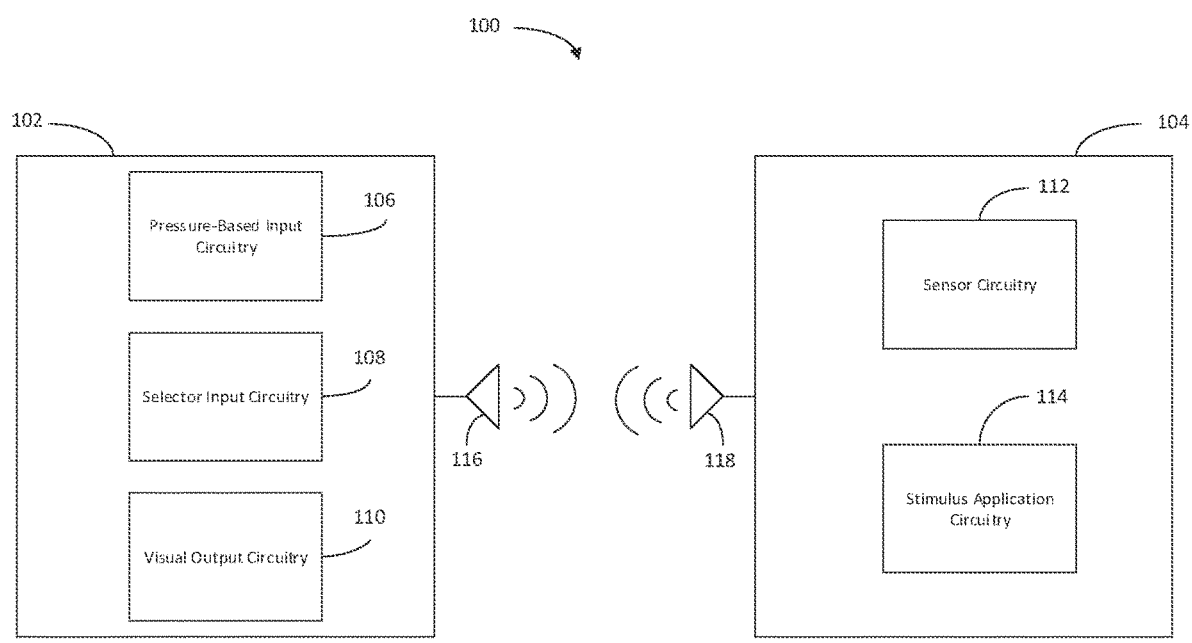
FIG. 1 is a block diagram of an illustrative training system having a transmitter with pressure-based input circuitry that communicates wirelessly with a receiver, in accordance with an embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of the invention.

The present disclosure relates to a system for animal training using a hand-held transmitter that communicates wirelessly with a remote receiver that controllably applies a selected stimulus to an animal being trained to complete one or more tasks at an amplitude determined by a pressure-based input of the hand-held transmitter. Ideally, only non-aversive stimuli are applied using the animal training system described herein. In accordance with the description herein of devices, components, and methods of use, an animal trainer may attach the remote device (i.e., receiver) to the animal in a manner suitable for training collars or harnesses. The trainer uses the hand-held device (i.e., transmitter) with one hand; in particular, even with one hand, the trainer can maintain precise control of the intensity of a stimulus applied to the animal by the remote device. This is accomplished by applying and removing pressure on the hand-held device's pressure-based input device, such as a button or trigger connected to a pressure transducer. Signal processing as described herein converts the amount of applied pressure into a corresponding stimulus amplitude that represents the proportional stimulus intensity. The present system simplifies the trainer's implementation of non-aversive training methods, in which low-level stimulus is applied and the intensity gradually increased as the animal is performing the desired task; when the task is complete, the stimulus intensity is gradually reduced and removed.

It is desirable to gradually reduce the amplitude of the applied stimulus after the animal being trained has completed a desired task, rather than to remove the stimulus all at once, in order to prevent the animal from becoming surprised or confused by the sudden disappearance of the stimulus. This gradual amplitude reduction of the applied stimulus ideally begins immediately after the animal completes the desired task. By controlling the rate of change of the applied stimulus in this way, the animal's performance improves more quickly than performance improvement observed in connection with traditional, aversive training approaches. Rate of change of the amplitude of the applied stimulus may therefore be controlled according to a predetermined rate of change threshold so that the animal does not receive an abrupt change in stimulus amplitude, which ensures effectiveness of training.

FIG. 1 shows an animal training system 100 having a hand-held transmitter 102 that communicates wirelessly with a receiver 104. Transmitter 102 includes pressure-based input circuitry 106, selector input circuitry 108, visual output circuitry 110 (optional), and an antenna 116. Receiver 104 includes sensor circuitry 112 (optional), stimulus application circuitry 114, and antenna 118.

Receiver 104 may be a housing that is attached to a collar strap or harness that is worn by an animal undergoing training. Signals received at antenna 118 are used to select a stimulus to be applied to the animal by stimulus application circuitry 114 and to control the amplitude of the selected, applied stimulus. In some instances, sensor circuitry 112 may optionally be included, which can utilize one or more of a variety of sensor types to detect conditions of both the animal being trained and the surroundings of the animal being trained.

Transmitter 102 may be a hand-held electronic device that is operated by a user to train the animal undergoing training. Pressure-based input circuitry 106 allows the user to control the level of stimulus applied at receiver 104. Selector input circuitry 108 allows the user to select a desired stimulus type to be applied by stimulus application circuitry 114 of receiver 104. Visual output circuitry 110 may optionally be included, which may display data corresponding to sensor data produced at sensor circuitry 112 of receiver 104. In some instances, sensor circuitry may be included at transmitter 102 for the purpose of proximity sensing with respect to receiver 104.

Pressure-based input circuitry 106 of transmitter 102 may include an input device that a user holding the transmitter 102 engages to apply a stimulus to the animal being trained. The circuitry 106 measures the pressure applied to the input device and converts the measured pressure into an input signal corresponding to a signal readable by the receiver 104 as a stimulus amplitude for a stimulus to be applied at stimulus application circuitry 114.

Selector input circuitry 108 of transmitter 102 allows the user to select a stimulus type from a group of selectable stimulus types to be applied at receiver 104.

Visual output circuitry 110 may display data to a user through a display device. The displayed data may be generated based on signals detected by specialized sensors in sensor circuitry 112. The visual output circuitry may display information derived from sensor data generated by the specialized sensors, such as video data, temperature data, proximity data, elevation data, or any other sensor data that can be conveyed on a screen.

Stimulus application circuitry 114 of receiver 104 may include a number of selectable stimuli that may be applied to the animal being trained at direction of the user. A type of stimulus may be determined by the stimulus type selected by selector input circuitry 108. The amplitude of the stimulus applied by stimulus application circuitry 114 may correspond to the amount of pressure applied by a user at pressure based input circuitry 106.

Sensor circuitry 112 of receiver 104 may include a variety of types of specialized sensors. Data generated by sensor circuitry 112 may be transmitted from receiver 104 to transmitter 102 for instances in which receiver 104 and transmitter 102 are each equipped with both wireless transmission circuitry and wireless reception circuitry. The data may undergo processing either at receiver 104 or at transmitter 102 in order to translate the data into a form that may be displayed to a user or that may be used to automate stimulus application performed by stimulus application circuitry 114.

Signals that control the type of stimulus and the amplitude of the stimulus applied at stimulus application circuitry 114 may be sent from antenna 116 of transmitter 102 to antenna 118 of receiver 104. In some instances, sensor data generated by sensor circuitry 112 may be sent from antenna 118 of receiver 104 to antenna 116 of transmitter 102. For instances in which antenna 116 and antenna 118 each perform both transmit and receive operations, each of antenna 116 and antenna 118 may be replaced with respective antenna systems that include multiple antennas and switching circuitry that enable wireless transmit/receive diversity between transmitter 102 and receiver 104.

Antennas 116 and 118 may communicate using any desired frequency range and communication protocol that allow for communication over a minimum range (e.g., 0.5 miles). For example, antennas 116 and 118 may communicate using radio frequency (RF) signals. These RF signals may be transmitted using FM or AM carrier signals, if desired. Optionally, antennas 116 and 118 may instead be configured to communicate using the Bluetooth® protocol when only short range (e.g., <100 m) communication between transmitter 102 and receiver 104 is required. Internal circuitries of transmitter 102 and receiver 104 are described in greater detail in connection with FIGS. 2 and 3.

Figure 2:
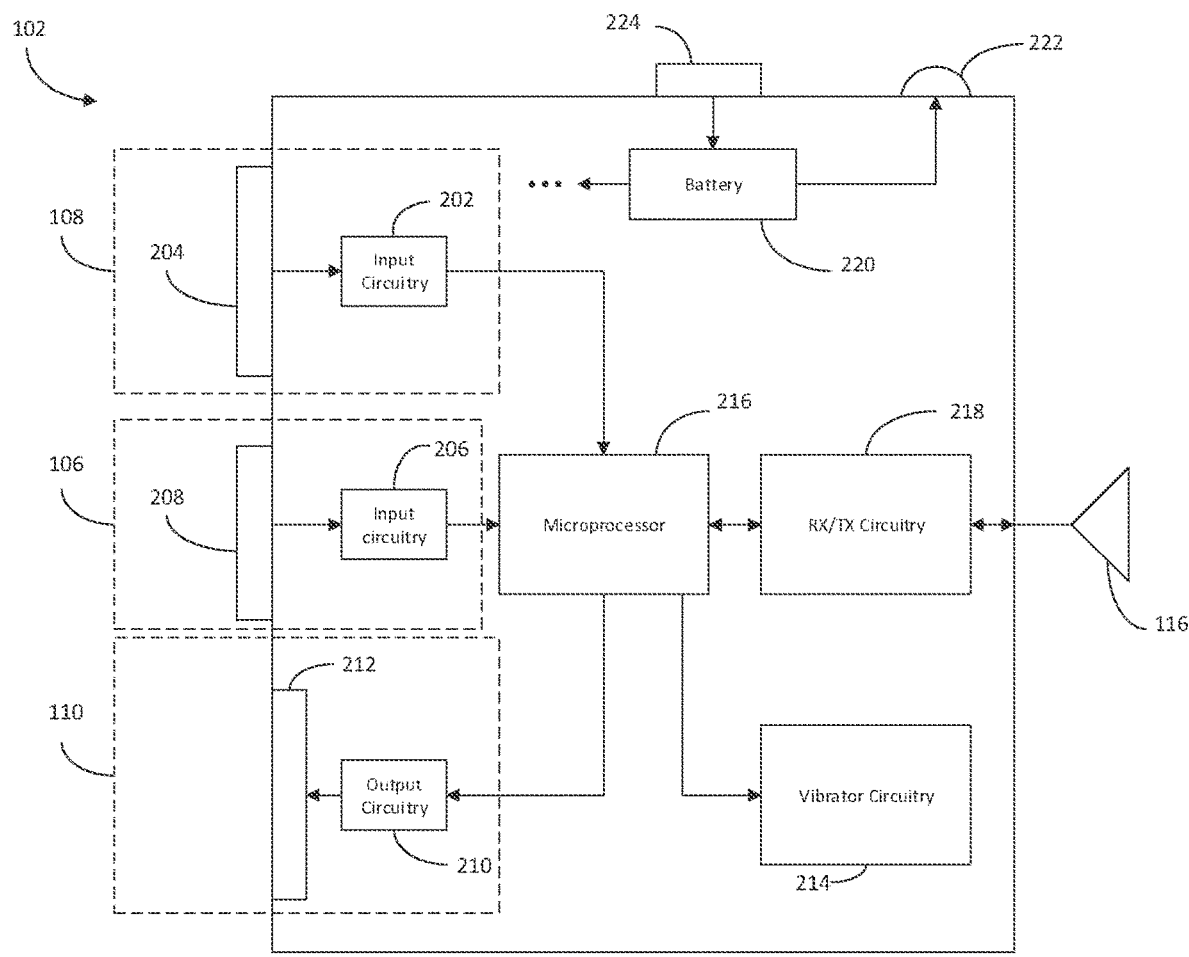
FIG. 2 is a block diagram of an example of the transmitter of FIG. 1.

FIG. 2 shows the transmitter 102 in greater detail. As shown, transmitter 102 includes pressure-based input circuitry 106, selector input circuitry 108, visual output circuitry 110, and antenna 116 as described above in connection with FIG. 1. Transmitter 102 further includes a microprocessor 216, transmit/receive circuitry 218, a power supply 220, a status indicator 222 (optional), and a power switch 224.

Pressure-based input circuitry 106 includes a pressure sensitive transducer 208, which may take the form of a pressure sensitive button or trigger that is capable of being operated using a single hand, and input circuitry 206, which may include circuitry (e.g., analog-to-digital conversion (ADC) circuitry and signal conditioning circuitry) required for front-end processing of pressure signals generated by transducer 208. Transducer 208 transforms a physical signal in the form of pressure applied to the pressure sensitive button/trigger into an electrical signal (referred to herein as a transducer signal) having an amplitude corresponding to the magnitude of the applied pressure.

Transducer 208 may include a force sensitive resistor (FSR). An example FSR is a conductive polymer having a resistance that changes predictably following an application of force to a surface of the conductive polymer. For example, pressure applied by a user to the FSR decreases the resistance of the FSR, causing an increase in the amplitude of a transducer signal produced by the pressure sensitive transducer. In the given example, the resistance of the FSR is inversely proportional to the level of pressure applied to the FSR, and the transducer signal produced is directly proportional to the level of pressure applied to the FSR.

A pressure delay may be applied, either mechanically or electrically, by input circuitry 206 at the pressure-sensitive input circuitry 106 such that a user has to apply a level of pressure exceeding a predetermined minimum pressure level to pressure-sensitive input circuitry 106 in order for any transducer signal to be produced at receiver 104. This delay helps to prevent the user from unintentionally applying a stimulus signal to the animal while the animal does not need to be engaged to perform a task. For example, the user may accidentally actuate the pressure sensitive button or other input to the pressure sensitive input circuitry 106 while handling transmitter 102 without meaning to apply a stimulus; the pressure delay will generally prevent this accidental actuation from causing a stimulus to be applied at receiver 104. The pressure delay can have a value that prevents unintentional stimulus application in typical situations, such that an expected magnitude of the accidental application of pressure to the pressure-sensitive input circuitry 106 inputs does not exceed the corresponding magnitude of the pressure delay. Alternatively, the pressure delay may be applied at microprocessor 216. Input circuitry 206 may perform ADC processing (optional) and signal conditioning on the transducer signal. The transducer signal is then passed from input circuitry 206 to microprocessor 216.

Selector input circuitry 108 includes a selector 204 and input circuitry 202. Selector 204 allows a user to select a stimulus type from a group of stimulus types to be applied at receiver 104. Selector 204 may be, for example, a rotational switch having numerous selectable positions (e.g., 8 positions), each (with the exception of the off position) corresponding to a different type of stimulus application to be applied at stimulus application circuitry 114 of receiver 104. At least one of the selectable positions corresponds to an off position in which no stimulus is applied at receiver 104. The off position may be used to turn the receiver on or off remotely. For example, pressure may be applied to transducer 208 for more than five continuous seconds while selector 204 is in the off-state in order to remotely turn the receiver 104 on or off, depending on the current on/off state of receiver 104 (e.g., receiver 104 will switch to an on/off state that is the opposite of the current on/off state of receiver 104). Each of the stimulus types able to be selected by selector 204 has a corresponding stimulus selection code that is generated at input circuitry 202 and that is provided to microprocessor 216 from input circuitry 202 when that position is selected.

Microprocessor 216 encodes and amplifies the transducer signal provided by input circuitry 206 and the stimulus selection code provided by input circuitry 202 in preparation for transmitting these signals to receiver 104 via antenna 116. Amplification of the transducer signal and stimulus selection code is performed for instances in which the respective amplitudes of the transducer signal and the stimulus selection code are not sufficiently large enough for reliable wireless transmission over a given distance (e.g., up to half a mile). Increasing signal amplitude through amplification is beneficial to retaining signal integrity across wireless transmission and reducing instances of signal loss. The encoding may be, for example, FM or AM encoding as described above in connection with FIG. 1. The encoded, amplified transducer signal and stimulus selection code are then sent to transmit/receive circuitry 218.

In some cases, microprocessor 216 may provide the stimulus selection code and the transducer signal to transmit/receive circuitry 218 in parallel. In such cases, transmit/receive circuitry 218 may include a serializer that serializes received transducer signals and stimulus selection codes in preparation for transmission at antenna 116. In particular, the serializer may take two parallel signals corresponding to the transducer signals and the stimulus selection codes and convert these signals into a single serial datastream that includes the bits from each of the two parallel signals. In some cases, this serialization may instead take place at microprocessor 216 before sending the transducer signals and stimulus selection codes to the transmit/receive circuitry 218.

Microprocessor 216 may control the magnitude of the rate of change of the transducer signal amplitude according to one or more predetermined rate thresholds. In particular, the amplitude of a given transducer signal is controlled such that the amplitude can only decrease at or below a given maximum rate over time (e.g., predetermined ramp-down rate of change, or threshold rate). It is generally preferred for the predetermined ramp-down rate for transducer signal amplitude to be applied when the user relieves the pressure on the input device entirely (i.e., the applied pressure drops to zero). Controlling the rate of change of the transducer signal amplitude in this way is beneficial to the effectiveness of the training. In particular, an animal learns a task faster when a cueing stimulus (e.g., the stimulus applied at stimulus application circuitry 114) is increased and decreased at a rate that is entirely controlled by the trainer, according to the pressure applied to the hand-held device input, as the animal performs the desired task; to counteract the trainer's tendency to completely relieve pressure on the hand-held device input when the task is complete, the stimulus amplitude can be decreased at a controlled gradual (i.e., non-instantaneous) rate that is set internally in the device. This prevents the animal from becoming confused as a result of an applied stimulus being removed all at once. The present device enables a user to apply the stimulus precisely as needed to keep the animal's focus on the training task. The device also enables the user to manually control the rate of stimulus reduction (i.e., by gradually relieving pressure on the transmitter input device) but can automatically control the rate of stimulus reduction when the user quickly releases pressure on the transmitter input device.

Antenna 116 may transmit the transducer signals and stimulus selection codes to receiver 104 as radio frequency (RF) signals at a frequency that is set by an internal clock that may be, for example, produced by a clock generator circuit in microprocessor 216. In some instances, the transmission frequency of antenna 116 may be selectable so that a single transmitter 102 can switchably communicate with multiple receivers 104, each having respectively unique communication frequency channel on which it receives signals.

When microprocessor 216 receives transducer signals from pressure-based input circuitry 106, microprocessor 216 may generate feedback control signals that are provided to vibrator circuitry 214. Vibrator circuitry 214 may include, for example, a pancake motor vibrator or any other desired vibration generator. The feedback control signals produced by microprocessor 216 instruct vibrator circuitry 214 to vibrate at a given intensity that corresponds to the amplitude of the corresponding encoded, amplified transducer signals. For example, the intensity of the vibrations produced by vibrator circuitry 214 may be proportional to the stimulus applied by the stimulus application circuitry 114 at receiver 104. In this way, a user is provided with near-instantaneous feedback regarding the intensity/magnitude of the stimulus being applied to the animal by the stimulus application circuitry 114 at receiver 104. In some instances, rather than being generated based on the amplitude of the encoded, amplified transducer signals, the feedback control signals may instead be generated based on a measured magnitude of the actual stimulus being applied by the stimulus application circuitry 114.

For instances in which receiver 104 includes sensor circuitry 112, sensor data generated by sensor circuitry 112 is transmitted to antenna 116 of transmitter 102 from antenna 118 of receiver 104 and is processed by the receiver portion of transmit/receive circuitry 218. In particular, the receiver portion of transmit/receive circuitry 218 may include decoder circuitry that decodes sensor data received at antenna 116, filter circuitry (e.g., one or more bandpass filters) that filters out undesirable noise that exists outside of the frequency range at which the sensor data is transmitted, and ADC circuitry that converts the analog RF signals carrying the sensor data into digital signals. Mixer circuitry and amplifier circuitry may also be included in the receiver portion of transmit/receive circuitry 218.

Microprocessor 216 then passes the sensor data to visual output circuitry 110. Visual output circuitry 110 includes output circuitry 210 and a screen 212. Output circuitry 210 processes the sensor data into a format that can be readily displayed and understood by the user. Screen 212 may be a LCD or LED screen that displays the processed sensor data. Displayed sensor data may include information relating to the proximity, location, elevation, acceleration, heart rate, and temperature of the animal being trained. Sensor data may be displayed that indicates the power, voltage, and/or current level driving a stimulus being applied at stimulus application circuitry 114 of receiver 104. Battery charge status for both transmitter 102 and receiver 104 may be displayed on screen 212. Sensor data corresponding to the animal's environment may also be displayed on screen 212, including detected chemical signature data (e.g., of flammable, dangerous, or controlled substances such as gasoline, carbon monoxide, components of explosives, or cocaine), biological signature data (e.g., of biohazard materials such as anthrax), light level data, and ambient temperature data.

Additionally, video data may be streamed to screen 212 for instances in which sensor circuitry 112 includes video imaging sensors.

Power supply 220 may act as a DC power source that powers all of the circuitry of transmitter 102. Power supply 220 may be, for example, a disposable DC battery or, if desired, may be rechargeable through a charging port (not shown). A power switch 224 may be switchable between an 'ON' position in which transmitter 102 is powered on and an 'OFF' position in which transmitter 102 is powered down. Alternatively, power switch 224 may be a button that, when pressed while transmitter 102 is powered down, turns transmitter 102 on, and that, when pressed and held for a predetermined amount of time (e.g., 5 seconds) turns transmitter 102 off.

An optional status indicator 222 includes one or more LEDS that may display different light conditions to represent different statuses of transmitter 102 and power supply 220. For example, status indicator 222 may be illuminated solid green while transmitter 102 is on and power supply 220 has a high level of charge (e.g., 75%-100% charged). Status indicator 222 may be illuminated solid yellow while transmitter 102 is on and power supply 220 has an intermediate level of charge (e.g., 25%-75% charged). Status indicator 222 may be illuminated solid red while transmitter 102 is on and power supply 220 has an intermediate level of charge (e.g., 1%-25% charged). Status indicator 222 may be illuminated blinking green while power supply 220 is charging in instances where power supply 220 is rechargeable. Status indicator 222 may not be illuminated while transmitter 102 is off.

It should be noted that some or all of circuit functions described above as being performed by input circuitry 202, input circuitry 206, output circuitry 210, and transmit/receive circuitry 218 may instead be performed by microprocessor 216 in order to reduce the number of discrete components required to manufacture transmitter 102. Alternatively, some or all of the circuit functions described above as being performed by microprocessor 216 may instead be performed by input circuitry 202, input circuitry 206, output circuitry 210, and/or transmit/receive circuitry 218.

Figure 3:
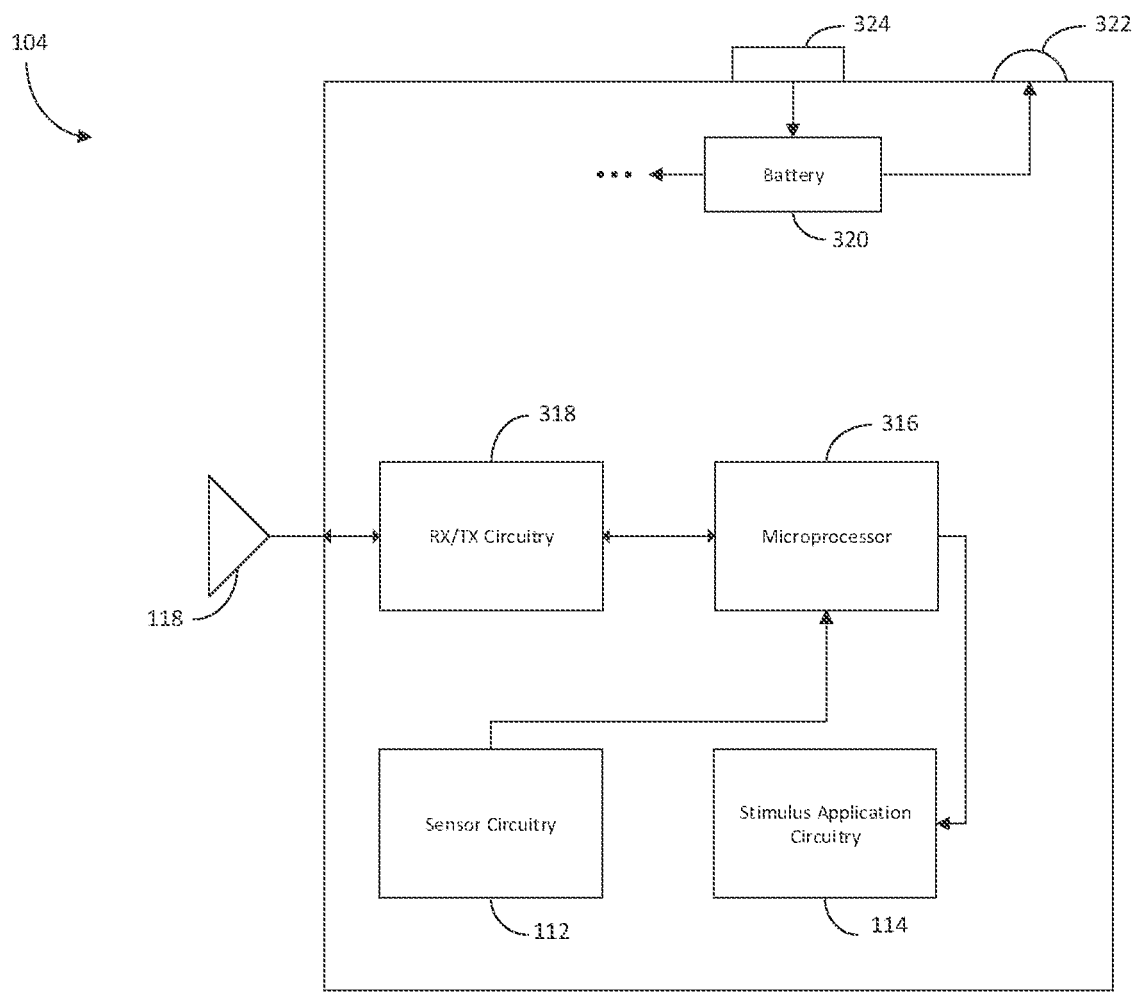
FIG. 3 is a block diagram of an example of the receiver of FIG. 1.

FIG. 3 shows the receiver 104 in greater detail. As shown, receiver 104 includes sensor circuitry 112, stimulus application circuitry 114, and antenna 118 as described above in connection with FIG. 1. Receiver 104 further includes a microprocessor 316, transmit/receive circuitry 318, power supply 320, status indicator 322, and power switch 324.

Power supply 320, status indicator 322, and power switch 324 may be similar in form and function to power supply 220, status indicator 222, and power switch 224 described above in connection with FIG. 2, excepting their application to receiver 104 rather than to transmitter 102. Some of the features of these components are not repeated here for brevity.

Stimulus application circuitry 114 may apply a variety of stimuli to the animal being trained including, but not limited to, electrical impulse stimulation, sound stimulation, percussion stimulation, light stimulation, vibration stimulation, taste stimulation, and smell stimulation. While some stimulus sources of stimulus application circuitry 114 may be internal to receiver 104, other stimulus sources may be located in other desired positions on the harness/collar worn by the animal. These external stimulus sources may still be communicatively coupled to receiver 104 either through wired electronic connections or through wireless communications. Sound stimulation may include audible, ultrasonic, and subsonic sounds, which may be generated by a mechanical speaker, a relay buzzer, or any other desired sound generator. Electrical impulse stimulation may be enabled by transformer control of low current (50 microamps to 100 milliamps) with high voltage (50 VAC to 10,000 VAC) and may be applied using electrodes on receiver 104 that are placed into direct contact with the animal when the collar is worn. Vibration stimulation may be applied using any of a motor-drive based vibrator, a mechanical offset fulcrum based vibrator, a pancake motor based vibrator, a ceramic based vibrator, a percussion based vibrator, and a transducer based vibrator. Smell stimulation may be applied that ranges from "pungent" to "flowery" smells. Taste stimulation may be applied that ranges from "sweet" to "poison" tastes. Light stimulation may include any desired range of spectrum colors and brilliances and may be applied using any desired light source, such as light emitting diodes. All of the various sources of stimulation listed above may be applied using any desired frequencies, pulse rates, duty cycles, pulse widths, amplitudes, durations, repetition rates, etc.

In addition to providing light stimulation at pressure-based variable intensity, a light source of the remote device may be used to illuminate the surrounding environment. In particular, the light source may have a variable luminance from zero (i.e., off, or dark) to full luminance, where the full luminance can be as bright as a flashlight or lamp. The transmitter 102 (e.g., the microprocessor thereof) may be configured to switch the receiver 104 between light-on and light-off modes, which may be controllable by the user with a separate input on the hand-held transmitter, or with the pressure sensitive input. For example, the microprocessor may be configured to determine that when the input device is fully depressed for a predetermined amount of time (e.g., five seconds), the receiver 104 should be switched from the current mode (light-on or light-off) to the other mode. To turn the light on, the microprocessor may encode the transducer signal at its maximum amplitude, controlling the stimulus application circuitry to activate the light and maintain it at full luminance. The microprocessor may maintain the transducer signal at maximum amplitude until the user inputs the off signal (e.g., depresses the button for another five seconds), after which the microprocessor returns to normal operation.

Antenna 118 receives transducer signals and stimulus selection codes from antenna 116 of transmitter 102 and provides the transducer signals and stimulus selection codes to transmit/receive circuitry 318. Transmit/receive circuitry 318 then processes the received transducer signals and stimulus selection codes. In particular, the receiver portion of transmit/receive circuitry 318 may include decoder circuitry that decodes transducer signals and stimulus selection codes received at antenna 118, filter circuitry (e.g., one or more bandpass filters) that filters out undesirable noise that exists outside of the frequency range at which the transducer signals and stimulus selection codes are transmitted, and ADC circuitry that converts the analog RF signals carrying the transducer signals and stimulus selection codes into digital signals. Mixer circuitry and amplifier circuitry may also be included in the receiver portion of transmit/receive circuitry 318.

The processed transducer signals and stimulus selection codes are routed to stimulus application circuitry 114 through microprocessor 316. Stimulus application circuitry 114 then applies (e.g., to the animal being trained) a stimulus of the type specified by the stimulus selection codes at an amplitude determined by the transducer signals. If stimulus application circuitry 114 has not received a transducer signal for a predetermined period of time, stimulus application circuitry 114 may automatically decrease the amplitude of the applied stimusus at a predetermined rate that matches the ramp-down rate threshold described above in connection with FIG. 2. In cases where stimulus amplitude rate control is not performed by microprocessor 216 of transmitter 102, if the rate at which the decrease of stimulus amplitude being requested by the transducer signals exceeds the predetermined ramp-down rate threshold, control circuitry located in microprocessor 316 or in stimulus application circuitry 114 controls the rate at which applied stimulus amplitude decreases. Additionally or alternatively, microprocessor 316 may include or access a memory that stores program logic for controlling the rate of decrease of the stimulus amplitude, and the microprocessor 316 may execute such program logic to decrease the stimulus amplitude in accordance with the desired ramp-down rate as described above.

Optional sensor circuitry 112 may produce sensor data using a variety of specialized sensors. These specialized sensors may include, but are not limited to, accelerometers, optical image/video sensors (e.g., optical cameras), sound sensors (e.g., microphones), temperature sensors, location sensors (e.g., GPS), proximity sensors, elevation sensors, electrical power/current/voltage sensors, heart rate sensors, battery capacity sensors, biological sensors, and chemical sensors. Generated sensor data is passed to transmit/receive circuitry 318 through microprocessor 316. Analog-to-Digital conversion, encoding, and amplification may be performed on the sensor data at microprocessor 316 before the sensor data is sent to transmit/receive circuitry 318 and then to the transmitter 102 as feedback to the trainer. The transmitter 102 may additionally be further equipped with cooperating sensing system components that enable generation of sensor data related to certain types of sensors connected to the receiver 104. For example, a first proximity sensor connected to and co-located with the receiver 104 may be part of a proximity sensing system that monitors and/or detects the distance between the transmitter 102 and the receiver 104. To implement such a system, a second proximity sensor may be connected to and co-located with the transmitter 102. These two proximity sensors may communicate with each other using any suitable range-finding protocol to generate sensor data encoding the distance between the two sensors.

Digital-to-Analog conversion may be performed on the sensor data at transmit/receive circuitry 318. In some cases, microprocessor 316 may provide the sensor data from multiple sensors to transmit/receive circuitry 318 in parallel. In such cases, transmit/receive circuitry 318 may include a serializer that serializes received sensor data in preparation for transmission at antenna 118. In particular, the serializer may take two parallel signals corresponding to sensor data from two different sensors and convert these signals into a single serial datastream that includes the bits from each of the two parallel signals. In some cases, this serialization of sensor data may instead take place at microprocessor 316 before sending the sensor data to the transmit/receive circuitry 318.

Antenna 118 may transmit the sensor data to transmitter 102 as RF signals at a frequency that is set by an internal clock that may be, for example, produced by a clock generator circuit in microprocessor 316.

It should be noted that some or all of circuit functions described above as being performed by transmit/receive circuitry 318 may instead be performed by microprocessor 316 in order to reduce the number of discrete components required to manufacture receiver 104. Alternatively, some or all of the circuit functions described above as being performed by microprocessor 316 may instead be performed by transmit/receive circuitry 318.

Figure 4:
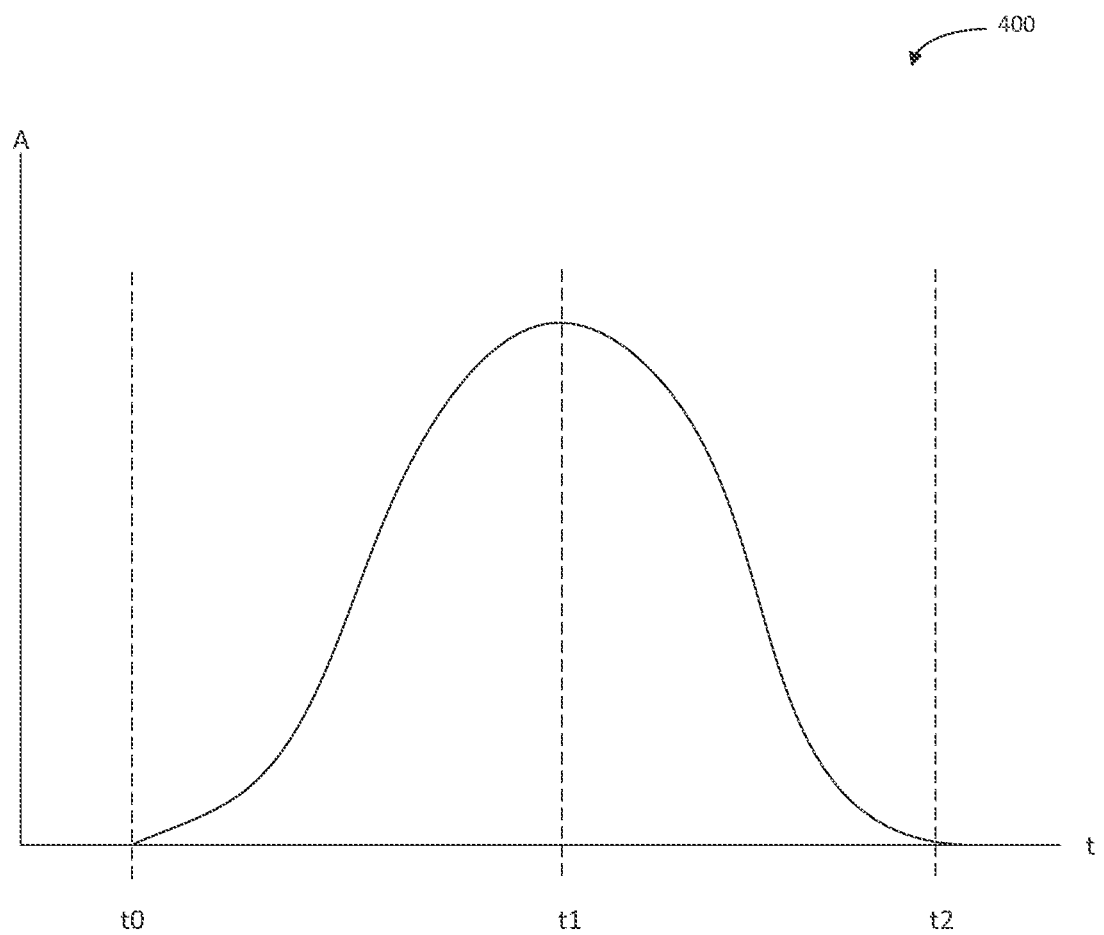
FIG. 4 is an illustrative graph of continuous signal amplitude versus time for a stimulus applied by the training system of FIG. 1, where the ramp-up rate and the ramp-down rate of the signal amplitude are the same.

FIG. 4 shows a graph 400 that illustrates stimulus amplitude (A) versus time (t) of a continuous stimulus applied by stimulus application circuitry 114 having an applied ramp-up rate that is equal to an applied threshold controlled ramp-down rate. From time $t_0$ to time $t_1$, pressure is applied to the pressure sensitive transducer 208 at a ramp-up rate determined by a user's application of pressure. From time $t_1$ to time $t_2$, no pressure is applied the pressure sensitive transducer 208. The rate of decrease of the applied pressure exceeds the ramp-down rate threshold for the amplitude of the stimulus, and the stimulus amplitude response from time $t_1$ to time $t_2$ is therefore controlled according to this ramp-down rate threshold.

For example, an animal may be undergoing training to travel to perform a simple task of traveling to a destination, picking up a ball or a bumper, and returning. The present example is intended to demonstrate a situation in which a user operates system 100 in a fashion that requires the ramp-down rate threshold to be applied to the stimulus amplitude as an efficacy measure. A user may begin pressing pressure sensitive transducer 208 (e.g., at a pressure level exceeding the pressure delay described above) on transmitter 102 beginning at time to such that a corresponding level of stimulus amplitude is requested at receiver 104 being worn by an animal being trained. The rate at which the applied stimulus amplitude is increased by the user is gradual, rather than transient. This gradual stimulus amplitude increase ensures that the training will be effective.

From time $t_0$ to time $t_1$, the animal travels to its destination as the applied stimulus amplitude increases. At time $t_1$, the animal successfully completes the desired task of picking up the ball or bumper and, in response, the user stops applying pressure to the pressure sensitive transducer 208 entirely. Rather than decreasing the amplitude of the applied stimulus all at once as requested by the user, a gradual decrease in applied stimulus amplitude is achieved from time $t_1$ to time $t_2$ at a rate set by the ramp-down rate threshold (e.g., as applied by microprocessor 216 of transmitter 102, the microprocessor 316 of receiver 104, or the stimulus application circuitry 114 of receiver 104). This gradual decrease of the applied stimulus amplitude follows the adrenal release of the animal being trained more closely, which results in more effective training and prevents the animal from being surprised or confused that the applied stimulus has suddenly disappeared. As the applied stimulus decreases from time $t_1$ to time $t_2$, the animal performs the task of returning to the user with the ball or bumper.

Figure 5:
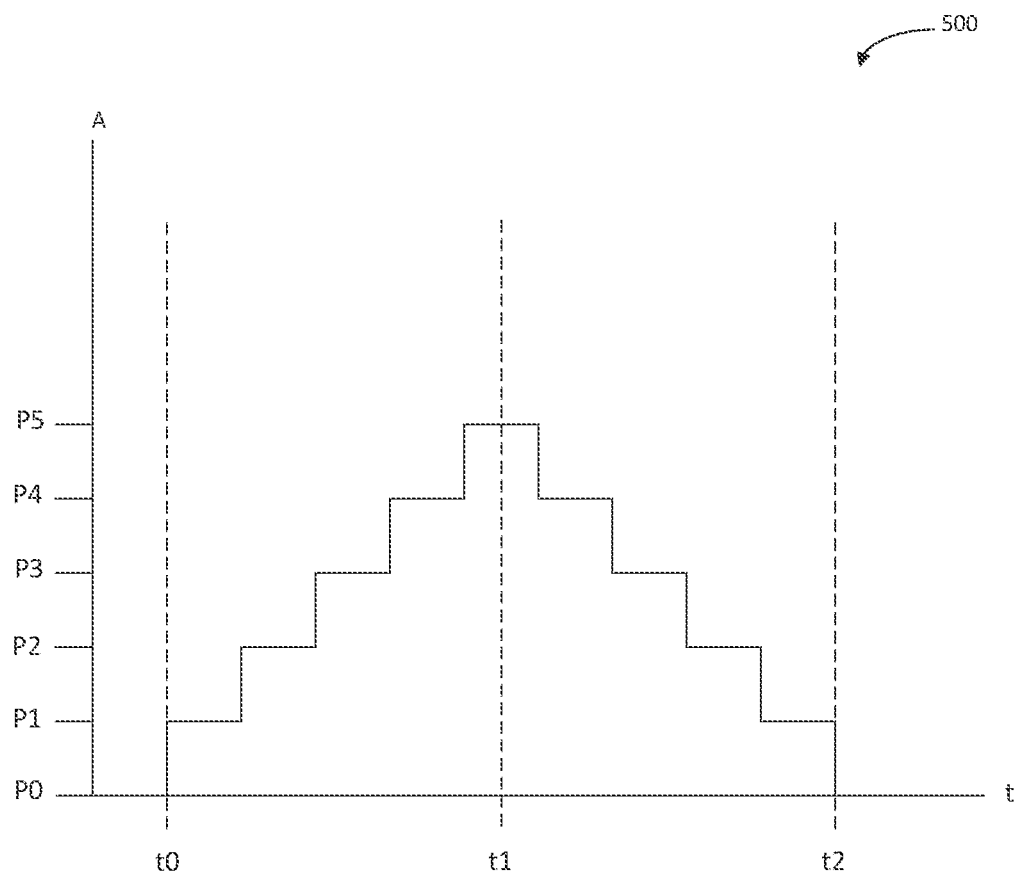
FIG. 5 is an illustrative graph of discrete signal amplitude versus time for a stimulus applied by the training system of FIG. 1, where the ramp-up rate and the ramp-down rate of the signal amplitude are the same.

FIG. 5 shows a graph 500 that illustrates stimulus amplitude (A) versus time (t) of a discrete stimulus applied by stimulus application circuitry 114 having an applied ramp-up rate that is equal to an applied threshold controlled ramp-down rate. The graph 500 represents the same scenario described above in connection with FIG. 4 only, rather than continuous increases and decreases in power level, the applied stimulus demonstrates discrete increases and decreases across discrete amplitudes P0-P5. In particular, Graph 500 may accurately represent stimulus amplitude response for instances in which stimulus application circuitry 114 is only capable of applying a predetermined number of discrete stimulus amplitudes. It should be noted that amplitude P5 is used here to illustrate the highest amplitude reached in the present example, but amplitude P5 may not be the highest amplitude achievable by system 100. Instead, other higher amplitudes of stimulus application may be achievable up to a maximum amplitude. This maximum amplitude is well below any amplitude capable of causing harm to the animal being trained. Generally, the amplitude applied during training does not necessarily need to reach or even approach this maximum amplitude in order to be effective.

Figure 6:
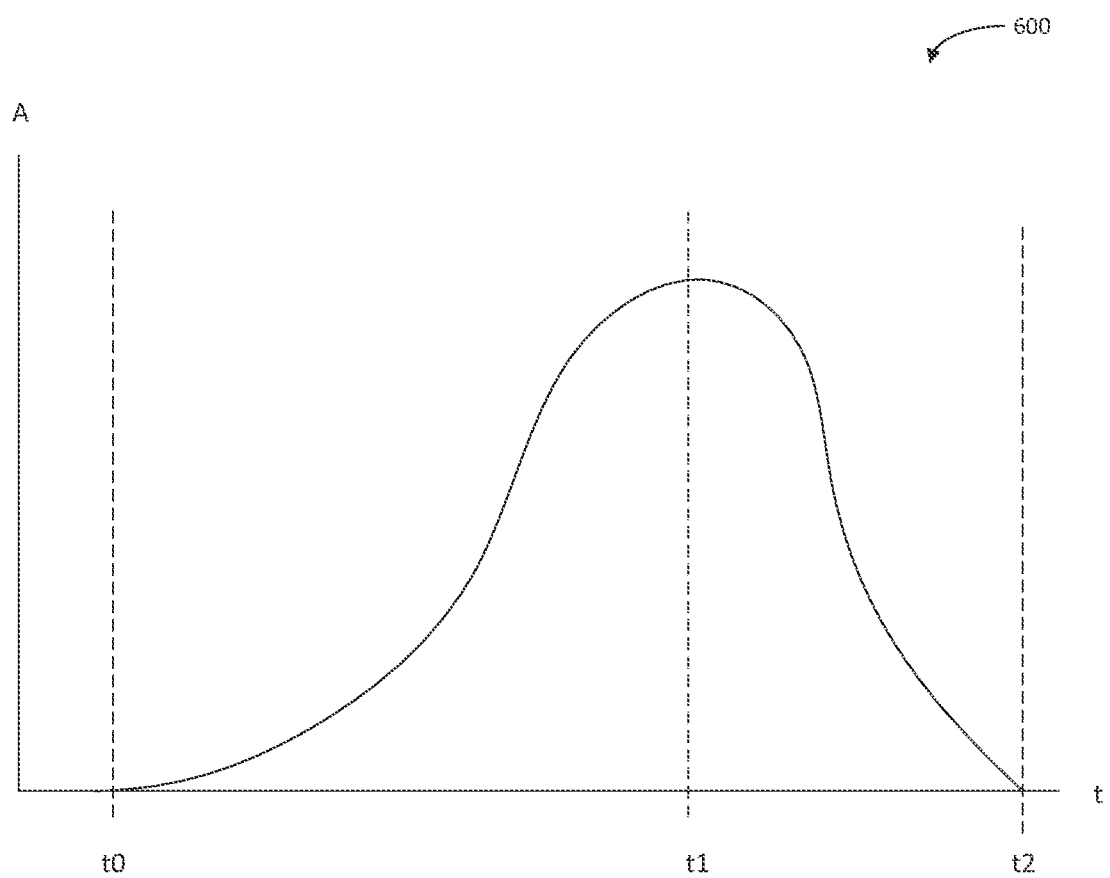
FIG. 6 is an illustrative graph of continuous signal amplitude versus time for a stimulus applied by the training system of FIG. 1, where the ramp-up rate and the ramp-down rate of the signal amplitude are different.

FIG. 6 shows a graph 600 that illustrates stimulus amplitude (A) versus time (t) of a continuous stimulus applied by stimulus application circuitry 114 having an applied ramp-up rate that is less than an applied threshold controlled ramp-down rate. In some instances it may be more effective to increase applied stimulus amplitude at a rate that is slower than that at which stimulus amplitude is decreased. The graph 600 represents the same scenario described above in connection with FIG. 4, only, rather than having an applied ramp-up that has the same magnitude as an applied threshold controlled ramp-down rate, the magnitude of the ramp-up rate applied by the user for graph 600 is less than the magnitude of the applied threshold controlled ramp-down rate.

Figure 7:
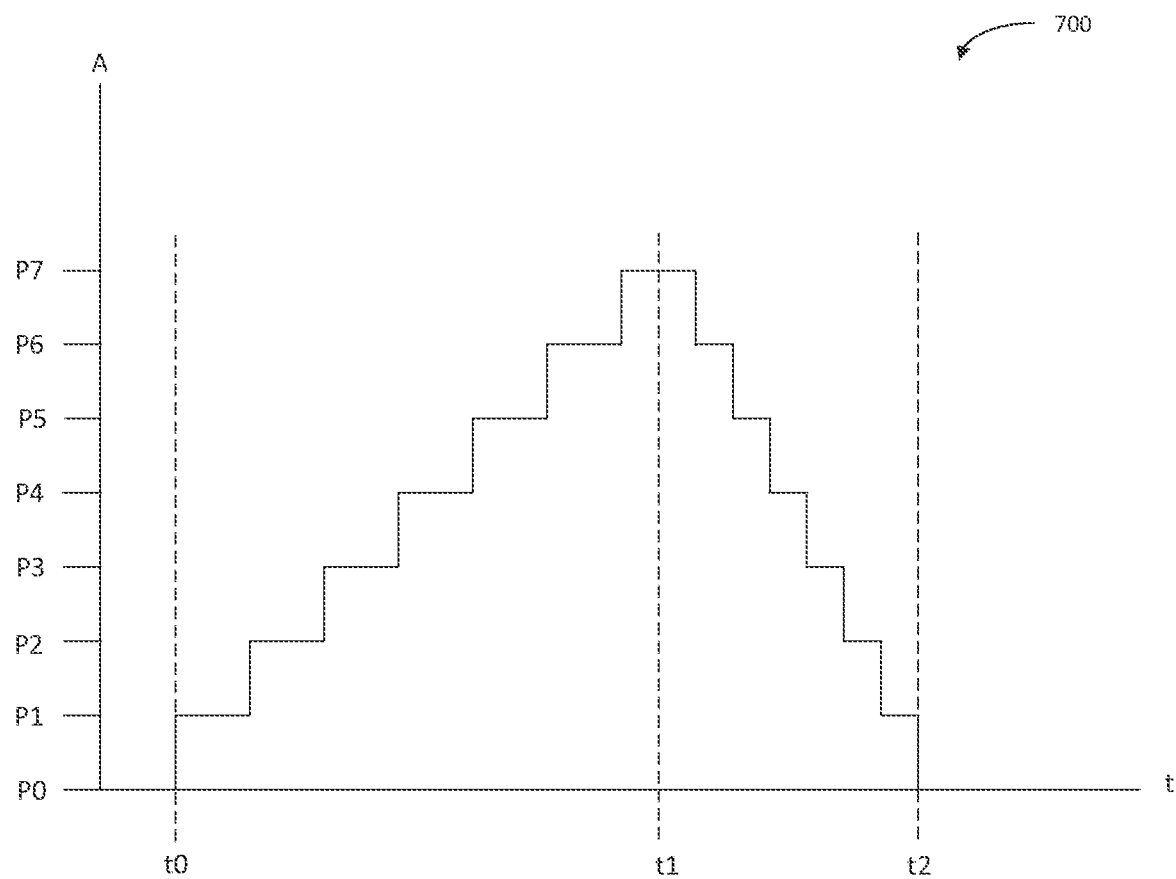
FIG. 7 is an illustrative graph of discrete signal amplitude versus time for a stimulus applied by the training system of FIG. 1, where the ramp-up rate and the ramp-down rate of the signal amplitude are different.

FIG. 7 shows a graph 700 that illustrates stimulus amplitude (A) versus time (t) of a discrete stimulus applied by stimulus application circuitry 114. The stimulus of the present example is applied across discrete amplitudes P0-P7. It is important to note that the discrete amplitude P7 is not necessarily the maximum amplitude achievable by system 100 (e.g., as described above in connection with amplitude P5 of FIG. 5). In some instances it may be more effective to increase applied stimulus amplitude at a rate that is slower than that at which stimulus amplitude is decreased. The graph 700 represents the same scenario described above in connection with FIG. 5 only, rather than having an applied ramp-up rate that has the same magnitude as an applied threshold controlled ramp-down rate, the ramp-up rate applied by the user for graph 700 has a magnitude that is less than the magnitude of the threshold controlled ramp-down rate.

Figure 8:
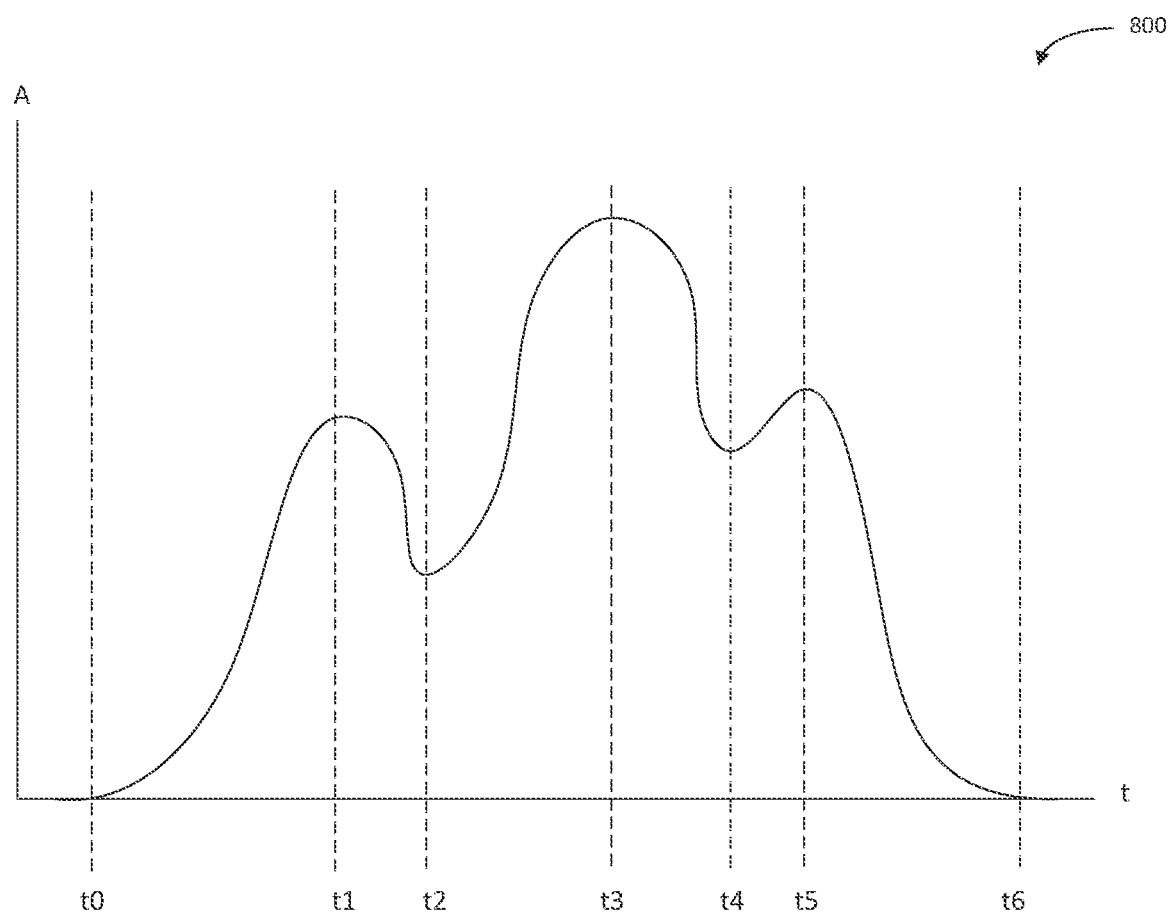
FIG. 8 is an illustrative graph of continuous signal amplitude versus time for a stimulus applied by the training system of FIG. 1, where the animal being trained is reengaged by multiple iterations of stimulus before completing a task.

FIG. 8 shows a graph 800 that illustrates stimulus amplitude (A) versus time (t) of a continuous stimulus applied by stimulus application circuitry 114 having multiple incidences of increasing and decreasing applied stimulus amplitude. At time periods $t_0$ to $t_1$, $t_2$ to $t_3$, and $t_4$ to $t_5$, pressure is applied to the pressure sensitive transducer 208. At time periods $t_1$ to $t_2$, $t_3$ to $t_4$, and $t_5$ to $t_6$, the pressure applied to the input device drops to zero, and the pressure sensitive transducer 208. The rate of decrease of the transducer signal amplitude during these periods is greater than the predetermined ramp-down rate threshold for the amplitude of the stimulus, and the stimulus amplitude response at these time periods is therefore controlled by this ramp-down rate threshold.

For example, an animal may be undergoing training to travel to perform a more complex task of traveling to a destination, picking up a single ball/bumper from among multiple balls/bumpers, and returning. The present example is intended to demonstrate a situation in which the ramp-down threshold needs to be applied to the stimulus amplitude as an efficacy measure. A user may begin pressing pressure sensitive transducer 208 (e.g., at a pressure level exceeding the pressure delay described above) on transmitter 102 beginning at time to such that stimulus application is requested at receiver 104 being worn by an animal being trained. The rate at which the applied stimulus amplitude is increased is gradual, rather than transient, corresponding to the user's input. This gradual stimulus amplitude increase ensures that the training will be effective.

From time $t_0$ to time $t_1$, the animal travels to its destination as the applied stimulus amplitude increases. At time $t_1$, the animal successfully achieves the desired task of picking up the ball/bumper and, in response, the user stops applying pressure to the pressure sensitive transducer 208 entirely. Rather than decreasing the amplitude of the applied stimulus all at once as requested by the user, a gradual decrease in applied stimulus amplitude is achieved from time $t_1$ to time $t_2$ at a rate set by the ramp-down rate threshold (e.g., as applied by microprocessor 216 of transmitter 102, the microprocessor 316 of receiver 104, or the stimulus application circuitry 114 of receiver 104). This gradual decrease of the applied stimulus amplitude follows the adrenal release of the animal being trained more closely, which results in more effective training and prevents the animal from being surprised or confused that the applied stimulus has suddenly disappeared.

At time $t_2$, the animal drops the ball/bumper and the user again begins increasing the amplitude of the applied stimulus in order to reengage with the animal and to signal to the animal that the task is not complete. The applied stimulus amplitude continues to increase until time $t_3$ at which point the animal picks up another ball/bumper (or the same ball/bumper that was initially picked up). In response, the user stops applying pressure to the pressure sensitive transducer 208 entirely, which triggers the application of the ramp-down rate threshold in controlling the ramp-down rate of the amplitude of the applied stimulus. At time $t_4$, the animal again drops the ball/bumper and the user again begins increasing the amplitude of the applied stimulus in order to reengage with the animal and to signal to the animal that the task is not complete. The applied stimulus amplitude continues to increase until time $t_5$ at which point the animal picks up a ball/bumper again and the user stops applying pressure to the pressure sensitive transducer 208 entirely. As the applied stimulus decreases from time $t_5$ to time t6, the animal performs the task of returning to the user with the ball or bumper.

Figure 9:
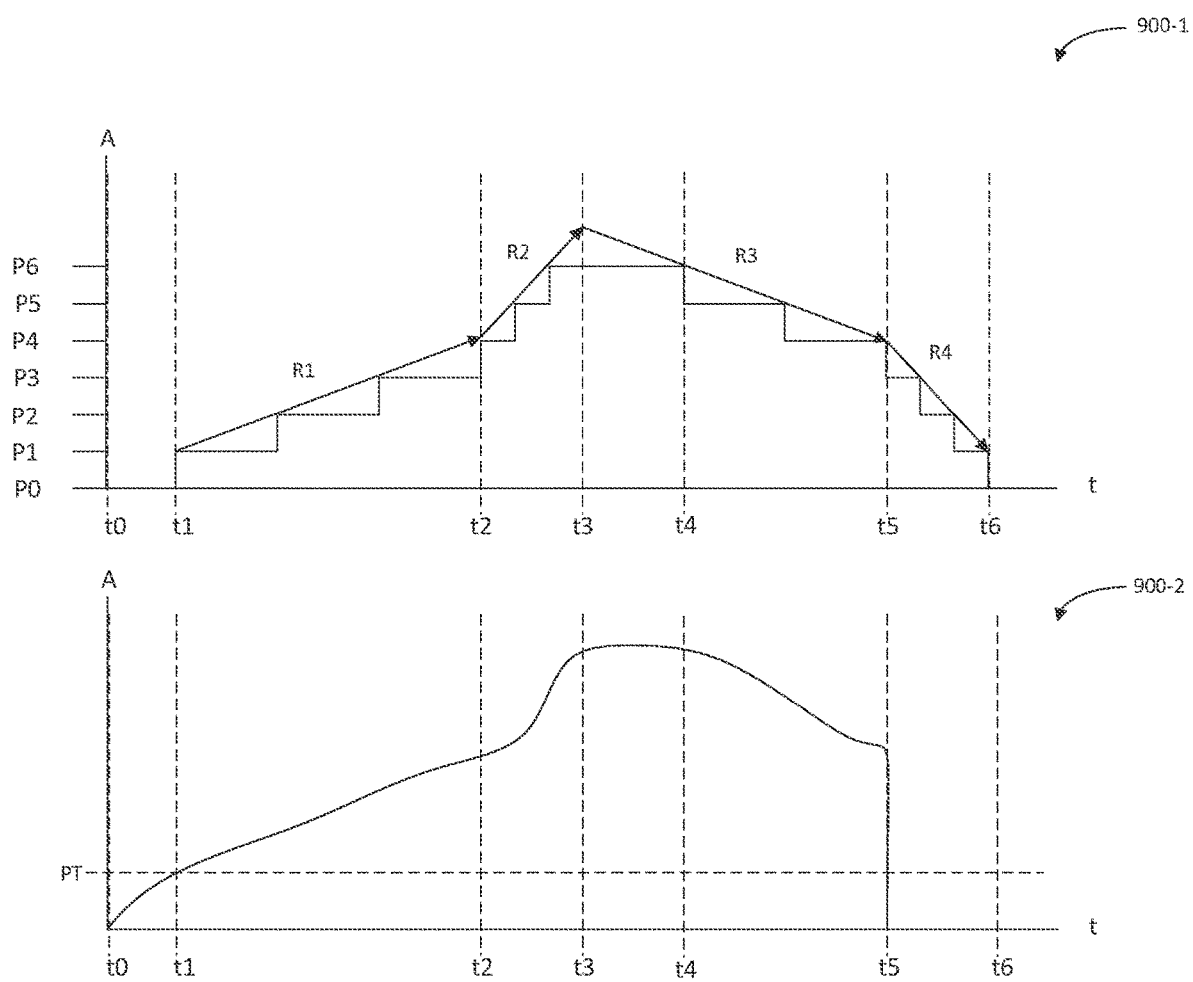
FIG. 9 is two illustrative graphs, one graph of discrete signal amplitude versus time for a stimulus applied by the training system of FIG. 1, and the other graph of a corresponding pressure signal amplitude versus time for a pressure-based control input used to control the discrete signal amplitude of the applied stimulus.

FIG. 9 shows graphs 900-1 and 900-2 that illustrate how, when operating system 100, user pressure input corresponds to stimulus amplitude response for a system having a discrete stimulus amplitude response, as controlled according to a predetermined ramp-down rate threshold. Graph 900-1 shows amplitude (A) versus time (t) of a discrete stimulus applied by stimulus application circuitry across discrete amplitudes P0-P6. Graph 900-1 shows amplitude (A) versus time (t) of a continuous pressure applied by a user to pressure sensitive transducer 208 across discrete amplitudes P0-P6. The timescale (t) is the same for both graph 900-1 and graph 900-2.

At time $t_0$, the user starts to apply pressure gradually at pressure sensitive transducer 208 in order to signal to the animal being trained to begin performing a task, for example, moving toward a destination. The applied pressure does not exceed the pressure threshold PT until time $t_1$, at which the transmitter begins transmitting transducer signals to the receiver and a stimulus is applied by the receiver. The amplitude of the stimulus applied by stimulus application circuitry 114 increases at a rate R1 that is proportional to the rate of increase of the amplitude of the applied pressure from time $t_1$ to time $t_2$. At time $t_2$, the user increases the amplitude of the applied pressure at an increased rate (e.g., the user is pressing harder, faster) and the rate of increase of the amplitude of the applied stimulus increases from time $t_2$ to time $t_3$ at an increased rate R2 that is greater than rate R1.

At time $t_3$, the animal achieves a goal, such as picking up a ball or a bumper at the destination, and in response the user begins to gradually decrease the amplitude of the applied pressure to signal to the animal to begin returning from the destination from time $t_3$ to time $t_5$. The amplitude of the stimulus applied by stimulus application circuitry 114 at receiver 104 decreases at a rate R3 that corresponds the rate of decrease of the amplitude of the applied pressure from time $t_3$ to time $t_5$ because the magnitude of the rate R3 is less than a predetermined ramp-down rate threshold for the applied stimulus. At time $t_5$, the user stops applying pressure entirely. As a result, the amplitude of the applied stimulus decreases from time $t_5$ to time $t_6$ at a controlled rate R4 set by the predetermined ramp-down rate threshold for the applied stimulus.

As demonstrated by graphs 900-1 and 900-2, the ramp-down rate threshold for the amplitude of the applied stimulus is only applied when a user attempts to exceed this rate threshold. When a user is operating system 100 in an effective manner, there is generally no need for the predetermined ramp-down rate threshold to set the rate of decrease for the amplitude of the applied stimulus.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

What is claimed is:

1. A remote training system comprising:
   a hand-held transmitter and a receiver for attachment to an animal to be trained, the transmitter and receiver enabled to communicate wirelessly with each other, the transmitter comprising:
      a housing sized to be held in one hand of a user;
      a pressure-sensitive input device supported by the housing and configured to be actuated by the hand holding the transmitter;
      first circuitry disposed within the housing and coupled to the input device, the first circuitry comprising a pressure sensor that, responsive to pressure applied to the input device, produces an input signal having an amplitude that corresponds to the pressure applied to the input device; and
      a microprocessor disposed within the housing in communication with the first circuitry, the microprocessor configured to:
         receive the input signal via the first circuitry;
         produce, based on the input signal, an encoded stimulus signal indicating a stimulus intensity that corresponds to the amplitude of the input signal; and
         cause the transmitter to transmit the encoded stimulus signal to the receiver; and
   the receiver comprising:
      second circuitry that receives the encoded stimulus signal from the transmitter; and
      stimulus application circuitry in communication with the second circuitry and configured to determine the stimulus intensity based on the encoded stimulus signal and apply to the animal a first non-aversive stimulus at the stimulus intensity.

2. The remote training system of claim 1, wherein the first circuitry comprises a transducer that produces the input signal and varies the amplitude of the input signal proportionally to an amount of pressure applied to the input device.

3. The remote training system of claim 1, wherein the transmitter further comprises vibrator circuitry that controls a vibrator to vibrate the housing at an intensity proportional to the stimulus intensity, the housing vibration providing feedback to the user regarding the stimulus intensity applied to the animal.

4. The remote training system of claim 3, wherein the microprocessor generates feedback control signals, and wherein the intensity at which the vibrator circuitry controls the vibrator to vibrate is determined by the feedback control signals.

5. The remote training system of claim 1, wherein the microprocessor is further configured to:
   determine, based on the input signal, whether the amount of pressure applied to the input device has decreased from a first amount of pressure to zero pressure; and
   responsive to a determination that the amount of pressure has decreased to zero, gradually reduce the stimulus intensity encoded in the encoded stimulus signal according to a predetermined rate of change.

6. The remote training system of claim 5, wherein to determine whether the amount of pressure applied to the input device has decreased from a first amount of pressure to zero pressure, the microprocessor receives the input signal and determines that the amplitude of the input signal is zero, corresponding to zero pressure applied to the input device.

7. The remote training system of claim 1, wherein the microprocessor is further configured to:
   determine, after a first duration of receiving the input signal, that the microprocessor is no longer receiving the input signal; and
   responsive to determining that the microprocessor is no longer receiving the input signal, gradually reduce the stimulus intensity encoded in the encoded stimulus signal to zero according to a predetermined rate of change.

8. The remote training system of claim 1, wherein the receiver further comprises a second microprocessor that:
   decodes the encoded stimulus signal to obtain information about the input signal; and
   responsive to an indication that the amount of pressure applied to the input device of the hand-held device has decreased to zero pressure, controls the stimulus application circuitry to gradually reduce the stimulus intensity according to a predetermined a rate of change.

9. The remote training system of claim 1, wherein:
   the microprocessor is further configured to:
      determine, based on a parameter of the input signal, that the amount of pressure on the input device is zero; and
      responsive to determining that the amount of pressure on the input device is zero, cause the transmitter to cease transmitting the encoded stimulus signal to the receiver; and
   the stimulus application circuitry of the receiver is further configured to:
      determine that the receiver is no longer receiving the encoded stimulus signal; and
      responsive to determining that the receiver is no longer receiving the encoded stimulus signal, gradually reduce the stimulus intensity of the stimulus applied to the animal from a current intensity to zero, according to a predetermined rate of change.

10. The remote training system of claim 1, wherein the pressure sensor comprises a force sensitive resistor that varies the amplitude of the input signal proportionally to the amount of pressure applied to the input device.

11. The remote training system of claim 1, wherein the first circuitry and the input device cooperate to enable a user holding the transmitter in a single hand to, with only the single hand, apply the stimulus to the animal and vary the stimulus intensity while the stimulus is being applied.

12. The remote training system of claim 1, wherein the receiver further comprises a sensor and the transmitter receives, from the receiver, feedback comprising sensor data generated by the sensor.

13. The remote training system of claim 12, wherein the transmitter further comprises a display supported by the housing and configured to display information relating to the sensor data to a user of the transmitter.

14. The remote training system of claim 1, wherein the microprocessor is further configured to:
   for a first period before a first time, determine, based on the input signal, that the amount of pressure applied to the input device is zero;
   responsively control the receiver to not apply the first non-aversive stimulus to the animal during the first period;
   responsive to receiving the input signal at the first time, determine based on the input signal that the amount of pressure increased from zero to a magnitude corresponding to the amplitude of the input signal received at the first time; and
   responsive to determining that the pressure increased from zero, gradually increase the stimulus intensity encoded in the encoded stimulus signal from no stimulus to the stimulus intensity that corresponds to the magnitude of the pressure applied to the input device.

15. The remote training system of claim 14, wherein to produce the encoded stimulus signal, the microprocessor is further configured to, for a second period beginning at the first time and corresponding to a duration that pressure remains applied to the input device, responsively control the receiver to apply the first non-aversive stimulus to the animal at the stimulus intensity that corresponds to the amplitude of the input signal continuously updated during the second period.

16. The remote training system of claim 15, wherein the microprocessor is further configured to:
   responsive to receiving the input signal at a second time ending the second period, determine based on the input signal that the amount of pressure on the input device decreased to zero; and
   responsive to determining that the pressure decreased to zero, control the receiver to gradually decrease the stimulus intensity at a predetermined rate of change.

17. A method of using a non-aversive stimulus to train an animal to perform a task, the method comprising:
   receiving, by a first microprocessor of a transmitter at a first time, an input signal generated by a pressure sensor of the transmitter in response to pressure applied to an input device of the transmitter, the input signal indicating that the pressure increased from zero at the first time;
   causing, by the first microprocessor, the transmitter to establish signal communication with a receiver worn by the animal and configured to apply the non-aversive stimulus;
   causing, by the first microprocessor, the transmitter to send a stimulus signal to the receiver that causes the receiver to set a stimulus intensity of the non-aversive stimulus to zero;
   for a first period beginning at the first time, continuously:
      receiving, by the first microprocessor, the input signal;
      responsive to receiving the input signal, determining, by the first microprocessor, an amplitude of the input signal, the amplitude corresponding to a magnitude of the pressure applied to the input device when the input signal was generated;
      determining, by the first microprocessor, the stimulus intensity that corresponds to the amplitude of the input signal;
      encoding, by the first microprocessor, the stimulus intensity into the stimulus signal; and
      causing, by the first microprocessor, the transmitter to send the stimulus signal to the receiver, the receiver responsively adjusting the non-aversive stimulus to be applied to the animal at the stimulus intensity.

18. The method of claim 17, further comprising:
   determining, by the first microprocessor based on the input signal, that the pressure applied to the input device dropped to zero at a second time ending the first period; and
   responsive to a determination that the pressure has dropped to zero, controlling, by the first microprocessor using the stimulus signal, the receiver to decrease the stimulus intensity applied to the animal gradually at a predetermined rate of change.

19. The method of claim 18, wherein the stimulus intensity decreasing from the second time at the predetermined rate of change reaches zero at a third time, the method further comprising:
   determining, by the first microprocessor based on the input signal, that the pressure applied to the input device increased from zero after the second time and before the third time; and
   responsively, by the first microprocessor:
      causing the transmitter to send a stimulus signal to the receiver that causes the receiver to set the stimulus intensity to zero; and
      for a second period that the pressure remainsis applied to the input device, continuously:
         receiving the input signal;
         responsive to receiving the input signal, determining the amplitude of the input signal;
         determining the stimulus intensity that corresponds to the amplitude of the input signal;
         encoding the stimulus intensity into the stimulus signal; and
         causing the transmitter to send the stimulus signal to the receiver, the receiver responsively adjusting the non-aversive stimulus to be applied to the animal at the stimulus intensity.

20. The method of claim 17, further comprising causing, by the first microprocessor while the pressure is applied to the input device by a user's hand holding a hand-held housing of the transmitter, a vibrator in the housing to vibrate the housing with a vibration intensity that is proportional to the stimulus intensity encoded in the stimulus signal, vibration of the housing in the hand providing feedback representing the stimulus intensity to the user.

* * * * *